Patented Sept. 29, 1936

2,055,666

UNITED STATES PATENT OFFICE

2,055,666

WEIGHTED OIL BASE DRILLING FLUID

Thomas V. Moore, La Porte, and George E. Cannon, Houston, Tex., assignors to Standard Oil Development Company, a corporation of Delaware No Drawing. Application October 17, 1934, Serial No. 748,662

13 Claims. (Cl. 255—1)

This invention relates to improvements in non-aqueous drilling fluid for use in drilling wells. More particularly, it relates to an oil-base drilling fluid containing a weighting material which is preferentially wet by oil as compared with water.

In the art of drilling wells for oil or gas by the rotary method, a fluid usually composed of a suspension of mud in water is pumped down the drill pipe to the drill bit in order to wash to the surface the particles of earth cut by the bit. In some areas earth formations are encountered which swell or disintegrate on contact with water and cave into the hole. It is difficult and sometimes impossible to penetrate these earth formations by ordinary methods of drilling. In many cases, such difficulties can be overcome by the use of a water-free drilling fluid, such as is described in the co-pending application of George E. Cannon and James L. Foster, Serial No. 731,649, filed June 21, 1934, entitled A water-free, weighted drilling fluid. Such a water-free drilling fluid may be composed of a powdered weighting material, such as silica, or ground oyster shells suspended in petroleum oil.

In accordance with the present invention, a non-aqueous drilling fluid is provided containing a weighting material which will remain suspended in the oil even though contaminated with large volumes of water and which may be recovered with the oil from water contaminated suspensions. The basis of the improved drilling fluid is preferably an oil such as petroleum crude oil, distillate or residue, or a coal tar distillate or residue, or an equivalent non-aqueous material that can be obtained in sufficient quantity at low cost. Tars of sufficiently low viscosity may be used as the base fluid. Other oil bases are crude oil which has been topped, gas oil, lubricating oil, kerosene, naphtha and the like.

The oil base, such as paraffin gas oil, is mixed with a powdered weighting material which has the characteristic of being wetted by the oil in preference to water. When water becomes mixed with the suspension of such a powdered weighting material in oil, the powder remains in the oil phase and when the emulsion becomes broken, the powder remains suspended in the oil.

The powdered weighting material may be any material having a greater tendency to be wetted by oil than by water. Such a powdered weighting material can be a carbonaceous coated weighting material, such as any substantially inert agent in the form of a powder coated with a hard film of carbon. The substantially inert agent can be barytes, powdered oyster shells, finely divided calcium carbonate, silica, sand, iron oxide, clays or earths, zinc dust, lead dust, other metal fillers or the like. Any of these powders can be carbonized by soaking them in a suitable inflammable liquid, such as petroleum oil, vegetable oil or the like and igniting the mixture. The resulting product is a powdered inert substance coated with a film of carbonaceous material.

An alternative form of weighting material of this type is the spent clay or earth used to filter oil in the refining of petroleum oil. During the filtration process the clay or earth particles adsorb carbonaceous residues from the oil and acquire the property of being specifically wetted by oil in preference to water.

Another class of materials having the property of being wetted by oil in preference to water comprises certain mineral substances, notably the metallic sulfides, such as iron pyrite, chalcopyrite, copper sulfide, lead sulfide, and the like. These minerals are specifically wetted by oil in their natural state and can be used as weighting material in the oil suspension without disposing a layer of carbon upon the particles of mineral.

By way of specific example, the following weighting materials can be used in an oil-base drilling fluid and can be separated with the oil when the drilling fluid becomes contaminated with water:

(1) Powdered oyster shells which have been soaked with cracking coil tar, obtained in the cracking of petroleum oils and ignited to form a layer of carbonaceous material upon each particle of the powder.

(2) Fuller's earth which has been used in filtering petroleum lubricating oils in the refining of the lubricating oil and which contains adsorbed carbonaceous residues.

(3) Iron pyrite ground to such a fine powder that it will remain suspended in petroleum oil.

(4) Powdered silica which has been soaked with cracking coil tar obtained from the cracking of petroleum oil and which has been ignited to cause a coating of carbonaceous material upon each particle of powdered silica.

(5) Powdered barytes which has been soaked with cracking coil tar obtained from the cracking of petroleum oil and which has been ignited to form a layer of carbonaceous material around each particle of barytes.

(6) Powdered iron oxide which has been soaked with cracking coil tar obtained from the cracking of petroleum oil and which has been ignited to form a deposit of carbonaceous material around each particle of iron oxide.

In order to ensure the substantially permanent suspension of the weighting material in the oil, we prefer to add a suitable amount of a suspension agent, such as hydrated lime or other alkaline material. In general, from 2 to 15% of the lime is sufficient and will enable the driller to use a weighting material which is not so finely ground as it would otherwise be necessary to use.

The following compositions are examples of drilling fluids which would be desirable for use under the conditions stated:

(1)

| | By volume |
|---|---|
| Carbonized silica | 40% |
| Lime | 15% |
| Paraffin gas oil | 45% |

In the above composition the paraffin gas oil constitutes the liquid base of the drilling fluid. The carbonized silica constitutes powdered silica which has been soaked with cracking coil tar derived during the cracking of petroleum oils and the mixture ignited to provide a coating of a hard film of carbon on the particles of silica. The carbonized silica functions as a weighting material in the composition and the lime acts as a suspension agent to keep the carbonized silica in suspension in the oil. Another form of composition is as follows:

(2)

| | By volume |
|---|---|
| Spent refinery filter clay | 40% |
| Lime | 15% |
| Crude petroleum oil | 45% |

In this composition the spent refinery filter clay is a clay which has been used successively in filtering petroleum lubricating oil to improve the color of the oil until the clay has lost a large portion of its decolorizing ability. The clay contains adsorbed carbonaceous residues from the oil which are wet by oil in preference to water. The cracked petroleum oil constitutes the liquid base of the composition and the lime is added to maintain the spent clay in suspension in the oil.

Another example of a suitable composition comprises:

(3)

| | By volume |
|---|---|
| Iron pyrites | 40% |
| Lime | 15% |
| Paraffin gas oil | 45% |

In this composition the paraffin gas oil constitutes the liquid suspension medium, the iron pyrite constitutes a powdered weighting material which is more readily wet by oil than by water and the lime functions to maintain the iron pyrite in suspension in the gas oil.

In utilizing the drilling fluid, the fluid is pumped into the well, withdrawn with the cuttings from the drill bit and passed into a settling basin. Water, encountered in the earth formations being drilled, admixes with the drilling fluid until the water accumulates in sufficient quantity to form an oil in water emulsion, which destroys the advantageous properties of the drilling fluid. The emulsion is allowed to settle in the settling basin, whereby the water and oil emulsion separate into two layers with the weighting material contained in the oil layer. If necessary, the oil and water emulsion can be treated with a suitable chemical, such as sodium tannate, to break the emulsion, or the emulsion may break without treatment. Having broken the emulsion, the water is decanted from the oil which carries the weighting material in suspension. The oil with its suspended weighting material is then recycled into the well.

The foregoing description is merely illustrative of preferred forms of the invention and various changes may be made within the scope of the appended claims, in which it is our intention to claim all novelty inherent in the invention as broadly as the prior art permits.

We claim:

1. A drilling fluid, comprising oil containing a suspended powdered weighting material having a greater tendency to be wetted by oil than by water.

2. A drilling fluid, comprising oil containing a suspended carbonaceous-coated weighting material.

3. A drilling fluid, comprising oil containing suspended powdered silica coated with carbonaceous material.

4. A drilling fluid, comprising oil in which is suspended clay which contains carbonaceous filter residues of petroleum oils.

5. A drilling fluid, comprising an oil in which is suspended a powdered mineral substance that is wetted by oil in preference to water.

6. A drilling fluid, comprising an oil in which is suspended powdered metallic sulfides.

7. A drilling fluid, comprising an oil in which is suspended powdered iron pyrite.

8. A weighting material for drilling fluids which is preferentially wetted by oil as compared with water.

9. A weighting material for drilling fluids, comprising a powdered substance which is coated with carbonaceous matter.

10. A weighting material for drilling fluids, comprising silica coated with carbonaceous matter.

11. A drilling fluid comprising an oil in which is suspended a powdered weighting material preferentially wetted by the oil and which contains alkaline material.

12. A drilling fluid comprising an oil in which is suspended a powdered material coated with carbonaceous matter and containing alkaline material.

13. A drilling fluid comprising an oil in which is suspended a metallic sulfide and containing alkaline material.

THOMAS V. MOORE.
GEORGE E. CANNON.